US012731856B2

(12) United States Patent
Lee

(10) Patent No.: US 12,731,856 B2
(45) Date of Patent: Sep. 8, 2026

(54) JIG FOR SURFACE TREATMENT OF A SEPARATOR AND A SEPARATOR FOR A FUEL CELL MANUFACTURED BY SAME

(71) Applicants: HYUNDAI MOTOR COMPANY, Seoul (KR); KIA CORPORATION, Seoul (KR)

(72) Inventor: Ji Han Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 976 days.

(21) Appl. No.: 17/875,634

(22) Filed: Jul. 28, 2022

(65) Prior Publication Data

US 2023/0187777 A1 Jun. 15, 2023

(30) Foreign Application Priority Data

Dec. 13, 2021 (KR) ........................ 10-2021-0177900

(51) Int. Cl.
*H01M 50/403* (2021.01)
*H01M 50/463* (2021.01)
*H01M 50/494* (2021.01)

(52) U.S. Cl.
CPC ....... *H01M 50/403* (2021.01); *H01M 50/463* (2021.01); *H01M 50/494* (2021.01)

(58) Field of Classification Search
CPC ............. H01M 8/0247; H01M 8/0254; H01M 8/0258; H01M 8/026; H01M 8/0263;
(Continued)

(56) References Cited

U.S. PATENT DOCUMENTS

2003/0152821 A1 8/2003 Lisi et al.
2005/0048353 A1* 3/2005 Lisi ..................... H01M 8/0226 429/434

(Continued)

FOREIGN PATENT DOCUMENTS

JP 2001266913 A * 9/2001
JP 2001345109 A * 12/2001

(Continued)

OTHER PUBLICATIONS

JP2001345109A translation (Year: 2001).*

(Continued)

*Primary Examiner* — Helen Oi K Conley
*Assistant Examiner* — Amanda Rosenbaum
(74) *Attorney, Agent, or Firm* — Lempia Summerfield Katz LLC

(57) ABSTRACT

Disclosed is a jig for surface treatment of a separator which is used to partially form a coating layer on a surface of the separator in which each land and each channel are alternately and repeatedly formed on one side and the other side according to a concavo-convex shape. In particular, the jig includes: a first jig which has a first plate part disposed on the one side of the separator and first mask parts protruding from the first plate part to cover an inner surface of one side-channel; and a second jig that has a second plate part disposed on the other side of the separator and second mask parts protruding from the second plate part to cover an inner surface of the other side-channel.

3 Claims, 9 Drawing Sheets

(58) Field of Classification Search
CPC ............. H01M 8/0265; H01M 8/1006; H01M 8/1065; H01M 50/403; H01M 50/463; H01M 50/494; H01M 50/406; C25D 5/022
See application file for complete search history.

(56) References Cited

U.S. PATENT DOCUMENTS

| | | | | |
|---|---|---|---|---|
| 2018/0069248 | A1 | 3/2018 | Suzuki et al. | |
| 2018/0375113 | A1* | 12/2018 | Kinpara | H01M 8/026 |

FOREIGN PATENT DOCUMENTS

| | | | |
|---|---|---|---|
| JP | 2005518073 | A | 6/2005 |
| JP | 6402831 | B2 | 10/2018 |
| KR | 101333884 | B1 | 11/2013 |

OTHER PUBLICATIONS

JP2001266913A translation (Year: 2001).*
Office action cited in Korean application No. 10-2021-0177900; Feb. 20, 2026; 12 pp.

* cited by examiner

-PRIOR ART-

-PRIOR ART-

-PRIOR ART-

JIG FOR SURFACE TREATMENT OF A SEPARATOR AND A SEPARATOR FOR A FUEL CELL MANUFACTURED BY SAME

CROSS REFERENCE TO RELATED APPLICATION

This application claims priority to and the benefit of Korean Patent Application No. 10-2021-0177900, filed Dec. 13, 2021, the entire contents of which are incorporated herein by reference.

BACKGROUND

Field

The present disclosure relates to a jig for surface treatment of a separator and a separator for a fuel cell manufactured by the jig.

Description of the Related Art

A fuel cell is a type of power generation device that converts chemical energy of fuel into electrical energy via electrochemical reaction in a fuel cell stack. It can be used not only to supply driving power for industrial use, household use, and vehicles, but also to power small electronic products such as portable devices, and its use is gradually expanding as a high-efficiency clean energy source.

In a typical fuel cell stack, a membrane-electrode assembly (MEA) is located at the innermost side, and the membrane-electrode assembly is composed of a polymer electrolyte membrane capable of moving hydrogen cations (Proton), and a catalyst layer coated on both sides of the polymer electrolyte membrane so that hydrogen and oxygen can react on an anode side and a cathode side, respectively.

In addition, a gas diffusion layer (GDL) is stacked on the outer portion of the membrane-electrode assembly, that is, on the outer portion where the anode and the cathode are located, A separator formed with a flow field to supply fuel and discharge water generated by the reaction is disposed on the outside of the gas diffusion layer, and an end plate for supporting and fixing each of the above-described components is coupled to the outermost portion. In this case, gaskets are formed in various patterns to maintain airtightness of hydrogen and oxygen (air) flowing in the separator.

On the other hand, the separator is generally manufactured in a structure in which a land serving as a support and a channel (passage) serving as a flow path of the fluid are repeatedly formed.

In other words, since a typical separator has a structure in which the land and the channel are repeatedly bent, the channel on one side facing the gas diffusion layer is used as a space through which a reactive gas such as hydrogen or air flows, and at the same time, the channel on the other side is used as a space through which cooling water flows. Thus, one unit cell can be composed of a total of two separators, such as one separator having a hydrogen/cooling water channel and one separator having an air/cooling water channel.

On the other hand, since the separator for a fuel cell basically has to have excellent corrosion resistance/electric conductivity, the separator is manufactured using SUS or Ti material with excellent corrosion resistance, and then the surface of the separator is coated with Au, Ag, Pt, carbon, and a conductive ceramic to impart conductivity to the surface.

The surface coating method of the separator mainly adopts an electroplating method in which an Au coating layer is formed on the surface of the separator by immersing the separator in a coating solution containing Au particles, which is advantageous in terms of mass productivity.

This type of coating roughly proceeds in the order of washing, degreasing, plating, and heat treatment processes, and each process condition may be changed depending on the applied material.

For example, the washing and degreasing processes are pretreatment processes that remove the oil or passivation film on the surface of the separator made of SUS or Ti material to facilitate the generation of conductive particles by applying an electric current. In this case, the processes are optimized by adjusting the type, concentration, temperature, and time of the washing and degreasing solutions.

In addition, the plating process is a process of precipitating and generating conductive particles on the surface of the separator by putting a prepared separator in an electrolyte solution (coating solution) containing conductive particles and applying an electric current. In this case, the number of conductive particles and the particle size are optimized by controlling the applied current and time.

The heat treatment process regenerates the passivation film removed in the washing process. By forming the passivation film around the conductive particles formed in the plating process, it is possible to obtain the effect of securing the material corrosion resistance while fixing the conductive particles. The thickness of the passivation film can be optimized adjusting the temperature/time of the heat treatment.

However, we have discovered that when conventionally, a typical electroplating method is applied to form a coating layer on the surface of the separator, there is a problem in that the coating layer is formed on all surfaces of the separator.

FIG. 1A is a view showing a conventional method of forming a coating layer on a surface of a separator, and FIG. 1B is a view showing a shape of a coating layer formed on a surface of a conventional separator.

As shown in FIGS. 1A and 1B, in order to form a coating layer 33 on the surface of the separator 30, the separator 30 in which lands 31 and channels 32 are alternately formed is prepared, and then a plurality of the separators 30 is spaced apart from each other, and then both sides of the separators 30 are fixed with jigs 40.

In this case, the jig 40 is formed with a mounting protrusion 41 for attaching both ends of the separator 30, and the separator 30 is fixed to the jig 40 by mounting the separator 30 on the mounting protrusion 41.

Then, the plurality of separators 30 fixed to the jig 40 is completely immersed in an immersion bath (bath) containing the electrolyte.

Then, a conductive coating layer 33 is formed on one surface and the other surface of the separator 30. In particular, the coating layer 33 is formed on both the side 32*a* and the bottom 32*b* constituting the channel 32 while being formed on the land 31 of the separator 30.

When the conductive coating layer is formed by the conventional general electroplating method in this way, the conductive coating layer is generated even in a channel that does not substantially require surface conductivity, and a loss occurs in terms of material.

In addition, by removing the passivation film on the surface of the separator made of SUS or Ti material to form the conductive coating layer, deterioration of corrosion resistance of the separator and heat treatment cost for regenerating the passivation film occur.

In addition, we have found that when the conductive particles coated on the channel of the separator are desorbed by the flow of reactive gas and generated water, there is a problem in that corrosion is accelerated from that part as a starting point.

The matters described as the background technology of the present disclosure are only for improving the understanding of the background of the present disclosure, and should not be taken as acknowledging that they correspond to the prior art already known to those of ordinary skill in the art.

SUMMARY

The present disclosure provides a jig for surface treatment of a separator and a separator for a fuel cell manufactured by the jig, capable of selectively forming a conductive coating layer only on lands.

The technical problems to be achieved by the present disclosure are not limited to the technical problems mentioned above, and it will be seen that other technical problems not mentioned can be clearly understood by those of ordinary skill in the art from the description of the present disclosure.

According to an embodiment of the present disclosure, a jig for surface treatment of a separator may be used to partially form a coating layer on a surface of the separator in which each land and each channel are alternately and repeatedly formed on one side and the other side according to a concavo-convex shape. The jig includes: a first jig having a first plate part and first mask parts; and a second jig having a second plate part and second mask parts. The first plate part is disposed on the one side of the separator and spaced apart from a one side-land of the separator in a direction of the one side, and the first mask parts protrude from the first plate part in a direction of a one side-channel of the separator to cover an inner surface of the one side-channel. The second plate part is disposed on the other side of the separator and spaced apart from the other side-land of the separator in a direction of the other side, and the second mask parts protrude from the second plate part into a direction of the other side-channel of the separator to cover an inner surface of the other side-channel.

The first jig is formed in a shape corresponding to the concavo-convex shape of the one side of the separator, and the first plate part and the first mask parts are integrally formed using a non-conductive material. The second jig is formed in a shape corresponding to the concavo-convex shape of the other side of the separator, and the second plate part and the second mask parts are integrally formed using the non-conductive material.

The first mask parts of the first jig are bent into a shape corresponding to the one side-channel of the separator to be in close contact with the inner surface of the one side-channel, and the second mask parts of the second jig are bent into a shape corresponding to the other side-channel of the separator to be in close contact with the inner surface of the other side-channel.

The first plate part of the first jig is formed to be narrower than a width of the one side-land of the separator, and the second plate part of the second jig is formed to be narrower than a width of the other side-land of the separator.

The first mask parts of the first jig includes a first side part that is in close contact with a side forming the one side-channel of the separator and a first bottom part that is in close contact with a bottom forming the one side-channel of the separator. The second mask parts of the second jig includes a second side part that is in close contact with a side forming the other side-channel of the separator and a second bottom part that is in close contact with a bottom forming the other side-channel of the separator.

The shape of one side of the first jig and the shape of the other side of the second jig correspond to each other, and the shape of the other side of the first jig and the shape of one side of the second jig correspond to each other.

According to another embodiment of the present disclosure, the first plate part of the first jig and the second plate part of the second jig are formed of a plastic material, and the first mask parts of the first jig and the second mask parts of the second jig are formed of a rubber material.

The first mask parts of the first jig include a first lower elastic body that is drawn into the one side-channel of the separator and is in close contact with the inner surface of the one side-channel of the separator while being deformed in shape by elasticity. The second mask parts of the second jig include a second upper elastic body that is drawn into the other side-channel of the separator and is in close contact with the inner surface of the other side-channel of the separator while being deformed in shape by elasticity.

A first lower support protrusion that protrudes into the one side-channel of the separator and is provided with the first lower elastic body at an end thereof is formed on the first plate part of the first jig. A second upper support protrusion that protrudes into the other side-channel of the separator and is provided with the second upper elastic body at the end thereof is formed on the second plate part of the second jig.

The first mask parts of the first jig include a first upper elastic body that is drawn into the other side-channel of the separator and is in close contact with the inner surface of the other side-channel of the separator while being deformed in shape by elasticity. The second mask parts of the second jig include a second lower elastic body that is drawn into the one side-channel of the separator and is in close contact with the inner surface of the one side-channel of the separator while being deformed in shape by elasticity.

A first upper support protrusion that protrudes into the other side-channel of the separator and is provided with the first upper elastic body at an end thereof is formed on the first plate part of the first jig. A second lower support protrusion that protrudes into the one side-channel of the separator and is provided with the second lower elastic body at the end thereof is formed on the second plate part of the second jig.

In addition, in a separator for a fuel cell according to an embodiment of the present disclosure, each land and each channel are alternately and repeatedly formed on one side and the other side corresponding to a concavo-convex shape, A first coating layer having conductivity is formed on one side of the one side-land, and a second coating layer having conductivity is formed on the other side of the other side-land.

No conductive coating layer is formed on the one side-channel and the other side-channel of the separator.

According to an embodiment of the present disclosure, a method for manufacturing a separator for a fuel cell includes: a separator preparation step of preparing a separator in which each land and each channel are alternately and repeatedly formed on one side and the other side corresponding to a concavo-convex shape; a first jig preparation step of preparing a first jig including a first plate part that is disposed and spaced apart from a one side-land of the separator in a direction of the one side, and first mask parts that protrude from the first plate part in a direction of the one side-channel of the separator to cover an inner surface of the one side-channel; a second jig preparation step of a second jig including a second plate part that is disposed on the other side of the separator and is spaced apart from the other side-land of the separator in a direction of the other side, and second mask parts that protrude from the second plate part into a direction of the other side-channel of the separator to cover an inner surface of the other side-channel; a jig disposition step of masking the one-side channel with the first mask parts while exposing the one side-land of the separator by disposing the first jig on the one side of the separator, and masking the other side-channel by the second mask parts while exposing the other side-land of the separator by disposing the second jig on the other side of the separator; and a coating step of forming a first coating layer on the exposed one side-land of the separator and forming a second coating layer on the exposed other side-land of the separator by immersing the separator on both sides masked by the first jig and the second jig in a coating solution.

According to an embodiment of the present disclosure, because the coating can be performed intensively only on the land of the separator requiring a reduction in contact resistance, the unnecessary loss of coating solution can be reduced, and when the amount of the coating solution is the same, it is possible to form a denser coating layer per unit area by reducing or minimizing the coating area, thereby minimizing contact resistance in the land.

In addition, because the passivation film is firmly formed on the channel of the separator and there are no conductive particles, it is possible to inhibit or prevent the phenomenon that the conductive particles are desorbed by the flow of reactive gas and generated water and the corrosion is started, and thus, the corrosion resistance of the separator can be increased.

In addition, in the conventional process, a heat treatment process for reforming the passivation film after formation of the conductive coating layer was required, but according to this embodiment, the heat treatment process can be deleted or reduced depending on the situation to reduce the manufacturing cost.

BRIEF DESCRIPTION OF THE DRAWINGS

In order that the disclosure may be well understood, there will now be described various forms thereof, given by way of example, reference being made to the accompanying drawings, in which.

Figure 1A:
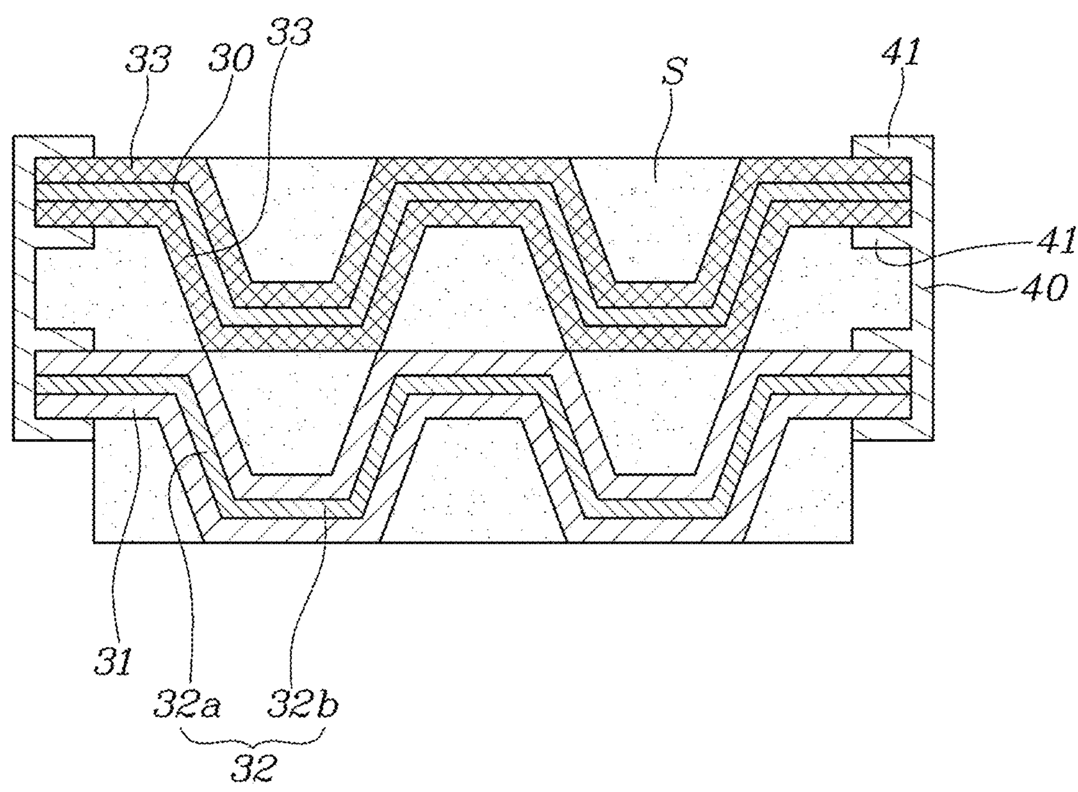
FIG. 1A is a view showing a conventional method of forming a coating layer on a surface of a separator.
Figure 1B:
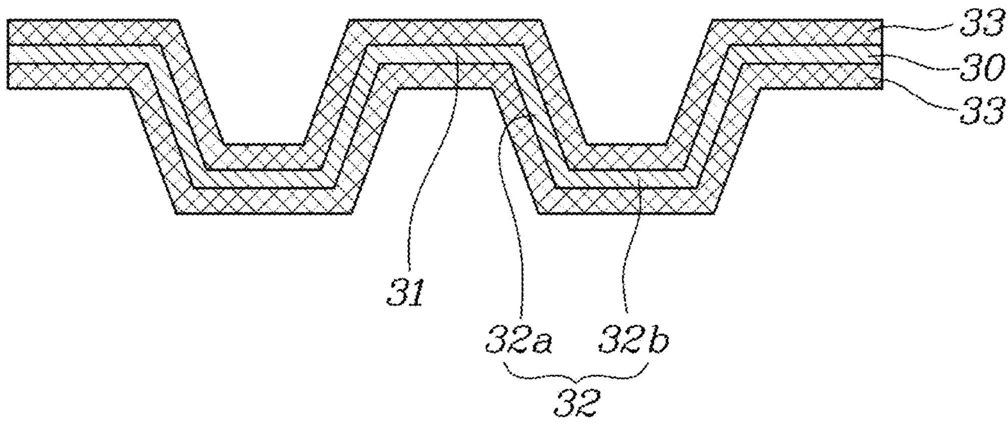
FIG. 1B is a view showing a shape of a coating layer formed on a surface of a conventional separator.

The drawings described herein are for illustration purposes only and are not intended to limit the scope of the present disclosure in any way.

DETAILED DESCRIPTION

Hereinafter, embodiments of the present disclosure are described in more detail with reference to the accompanying drawings. However, the present disclosure is not limited to the embodiments disclosed below, but should be implemented in various different forms. These embodiments are provided only so that the disclosure of the present disclosure is complete, and to fully inform those of ordinary skill in the scope of the present disclosure. In the drawings, like reference numerals refer to like elements.

Figure 2:
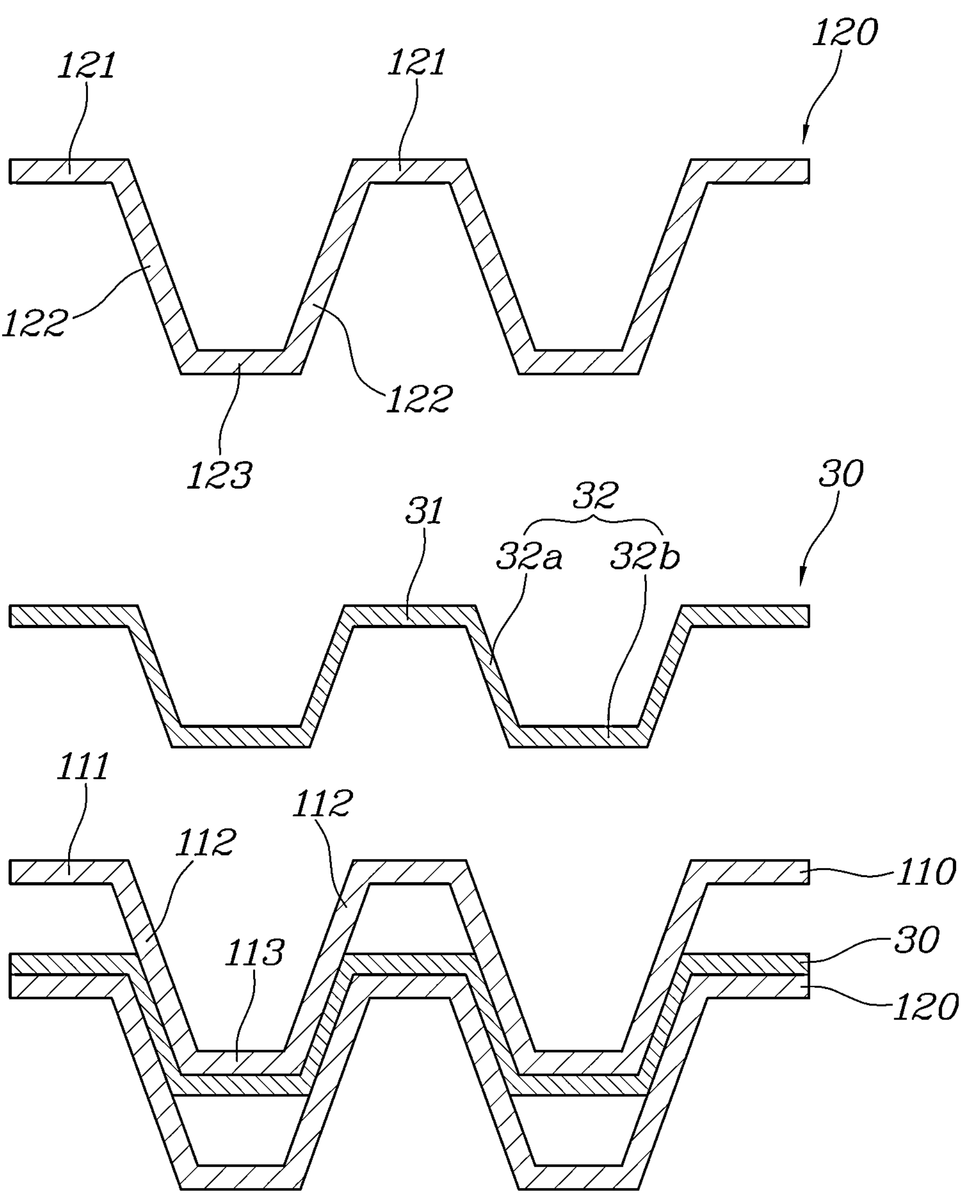
FIG. 2 is a view showing a structure and arrangement of a jig for surface treatment of a separator according to an embodiment of the present disclosure.
Figure 3A:
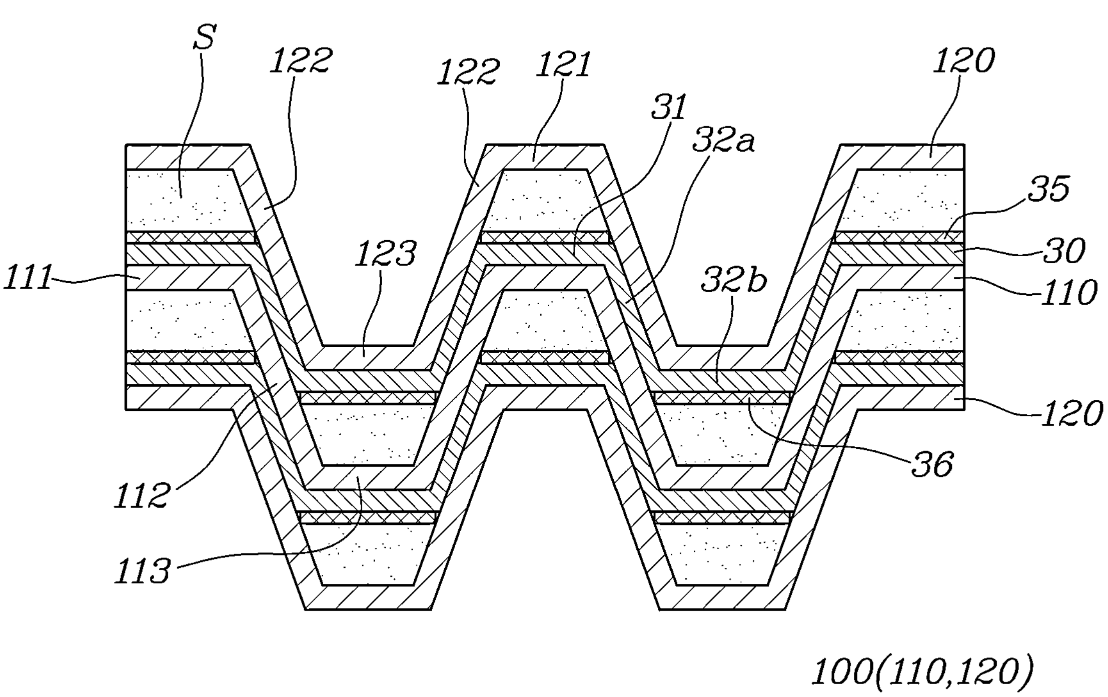
FIG. 3A is a view showing a method for forming a coating layer using a jig for surface treatment of a separator according to an embodiment of the present disclosure.
Figure 3B:
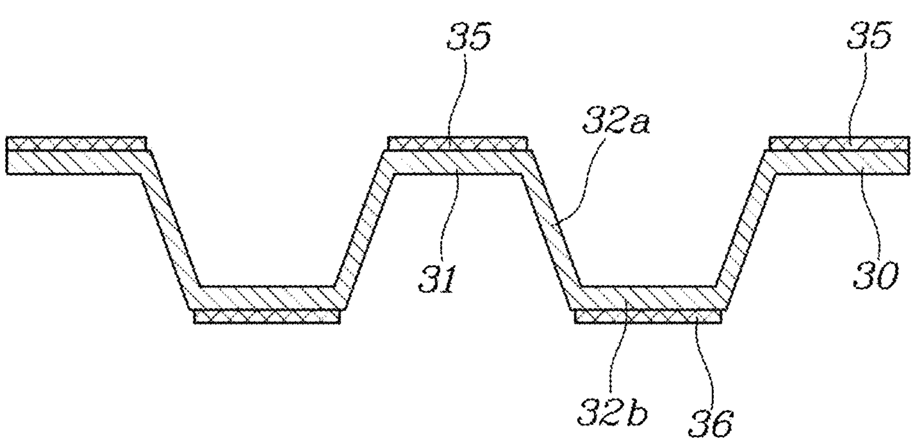
FIG. 3B is a view showing a separator for a fuel cell manufactured using a jig for surface treatment of a separator according to an embodiment of the present disclosure.

FIG. 2 is a view showing a structure and arrangement of a jig for surface treatment of a separator according to an embodiment of the present disclosure, FIG. 3A is a view showing a method for forming a coating layer using a jig for surface treatment of a separator according to an embodiment of the present disclosure, and FIG. 3B is a view showing a separator for a fuel cell manufactured using a jig for surface treatment of a separator according to an embodiment of the present disclosure.

First, a separator for a fuel cell according to one embodiment of the present disclosure is described below.

As shown in FIG. 3B, a separator 30 for a fuel cell is made of a metal material, for example, SUS or Ti material with excellent corrosion resistance, and each land 31 and each channel 32 are alternately repeatedly formed on one side and the other side corresponding to a concavo-convex shape.

In this case, one side of the separator 30 corresponds to a reaction surface through which air or hydrogen flows, and the other side of the separator 30 corresponds to a cooling surface through which cooling water flows.

Therefore, a plurality of lands 31 in contact with a membrane-electrode assembly 10 or a gas diffusion layer 20 is formed on one side of the separator 30, and the channel 32 through which air or hydrogen flows is formed between the plurality of lands 31. Therefore, in the following description, the land formed on one side of the separator is referred to as a one side-land, and the channel formed on one side of the separator is referred to as a one side-channel.

In addition, a plurality of lands in contact with the separator of an adjacent unit cell when the fuel cell stack is disposed is formed on the other side of the separator. And the channel through which the coolant flows is formed between the plurality of lands. Therefore, in the following description, the land formed on the other side of the separator is referred to as the other side-land, and the channel formed on the other side of the separator is referred to as the other side-channel.

In this way, one side and the other side of the separator 30 have a structure symmetrical to each other.

Therefore, the other side of the area in which the one side-land of the separator is formed corresponds to the bottom of the other side-channel. In addition, the one side of the area in which the other side-land of the separator is formed corresponds to the bottom of the one side-channel. Accordingly, in the following description, when the land 31 or the channel 32 is referred to without any special indication, it is the description about the one side-land or the one side-channel.

Based on the above criteria, in the separator for a fuel cell according to an embodiment of the present disclosure, the land 31 is formed, and the channel 32 is formed to be bent in the direction of the other side of the land 31. In this case, the channel 32 includes a side 32*a* extending from the land 31 and bent, and a bottom 32*b* extending from the side 32*a* and bent.

According to an embodiment of the present disclosure, in the separator for a fuel cell, a first coating layer 35 with conductivity is formed on one side of the one side-land, and a second coating layer 36 with conductivity is formed on the other side of the other side-land.

This means that the first coating layer 35 is formed on one side of the land 31, and the second coating layer 36 is formed on the other side of the bottom 32*b* forming the channel 32.

In one form of the present disclosure, the conductive coating layer is not formed on the one side-channel and the other side-channel.

This means that the conductive coating layer is not formed on the other side of the land 31, on both sides of the side 32*a* forming the channel 32, and on one side of the bottom 32*b* forming the channel 32.

Therefore, a passivation film remains or is formed in a predetermined thickness in the one side-channel and the other side-channel of the separator 30 due to the characteristics of the material of the separator.

In the present disclosure, in order to manufacture the separator having the above structure by the electroplating method, the jig for surface treatment of the separator that attaches the plurality of separators during the electroplating process and immerses them in the coating solution (S) was manufactured.

The jig for surface treatment of the separator according to the present disclosure is provided with a structure for exposing one side of the one side-land on which the first coating layer 35 and the second coating layer 36 are formed and the other side of the other side-land to the coating solution (S), in the above described separator structure, while masking the other areas.

For example, as shown in FIG. 2, the jigs 110, 120 for surface treatment of a separator according to an embodiment of the present disclosure includes a first jig 110 that covers the one side-channel 32 while exposing the one side-land 31 of the separator 30, and a second jig 120 that covers the other side-channel while exposing the other side-land of the separator 30.

In other words, the first jig 110 includes: a first plate part 111 that is disposed on one side of the separator 30 and disposed spaced apart from the one side-land 31 of the separator 30 in a direction of one side; and first mask parts 112, 113 that protrude from the first plate part 111 in the direction of the one side-channel 32 of the separator 30 to cover the inner surface of the one side-channel 32.

In this case, the first plate part 111 is formed to be flat in a shape corresponding to the one side-land 31 of the separator 30.

In addition, the first mask parts 112, 113 are formed by being bent in a shape corresponding to the one side-channel 32 of the separator 30. Accordingly, the first mask parts 112, 113 have the first side part 112 that extends from the first plate part 111 to correspond to the side 32*a* forming the one side-channel 32 of the separator 30 and the first bottom part 113 that extends from the first side part 112 and is bent to correspond to the bottom forming the one side-channel 32 of the separator 30.

In this case, the first plate part 111 of the first jig 110 is formed to be narrower than the width of the one side-land 31 of the separator 30. Thus, when the first side part 112 of the first jig 110 is in close contact with the side forming the channel 32 of the separator 30, the first plate part 111 of the first jig 110 and the one side-land 31 of the separator 30 are spaced apart from each other. Therefore, the first side part 112 of the first jig 110 may be slightly longer than the side 32*a* forming the channel 32 of the separator 30.

Similarly, the second jig 120 includes: a second plate part 121 that is disposed on the other side of the separator 30 and disposed spaced apart from the other side-land of the separator 30 in a direction of the other side; and second mask parts 122, 123 that protrude from the second plate part 121 in the direction of the other side-channel of the separator to cover the inner surface of the other side-channel.

Therefore, the second plate part 121 is formed flat in a shape corresponding to the other side-land of the separator 30. The second mask parts 122, 123 include: a second side part 122 that extends from the second plate part 121 to correspond to the side 32*a* forming the other side-channel of the separator 30 and is bent; and a second bottom part 123 that extends from the second side part 122 and is bent to correspond to the bottom 32*b* forming the other side-channel of the separator 30.

In another form, the second plate part 121 of the second jig 120 is also formed to be narrower than the width of the other side-land 31 of the separator 30, similarly to the first plate part 111 of the first jig 110.

On the other hand, as described above, since the separator 30 has the structure in which the one side and the other side are symmetric to each other, the first jig 110 and the second jig 120 also have a symmetrical structure to each other.

In other words, the shape of one side of the first jig 110 and the shape of the other side of the second jig 120 are structures corresponding to each other, and the shape of the other side of the first jig 110 and the shape of one side of the second jig 120 are also structures corresponding to each other.

In one embodiment, when the fuel cell stacks are stacked, a plurality of separators is stacked. With respect to any one separator, the first jig 110 disposed on one side of the separator 30 may serve as the second jig 120 that is disposed on the other side the separator 30 adjacent to that separator 30.

On the other hand, when the electroplating method of forming the first coating layer 35 and the second coating layer 36 on the surface of the separator 30 using the first jig 110 and the second jig 120 is performed, the first jig 110 and the second jig 120 are made of a non-conductive material so that the coating layer is not formed on the surfaces of the first jig 110 and the second jig 120.

For example, the first jig 110 is formed in a shape corresponding to the concavo-convex shape of one side of the separator 30, and the first plate part 111 and the first mask parts 112, 113 are integrally formed using a non-conductive material.

In addition, the second jig 120 is formed in a shape corresponding to the concavo-convex shape of the other side of the separator 30, and the second plate part 123 and the second mask parts 122, 121 are integrally formed using a non-conductive material.

In one form, the first jig 110 and the second jig 120 are made of a non-conductive plastic material having excellent corrosion resistance.

Meanwhile, in the present disclosure, the first mask parts of the first jig and the second mask parts of the second jig may be implemented with different materials and structures.

Figure 5A:
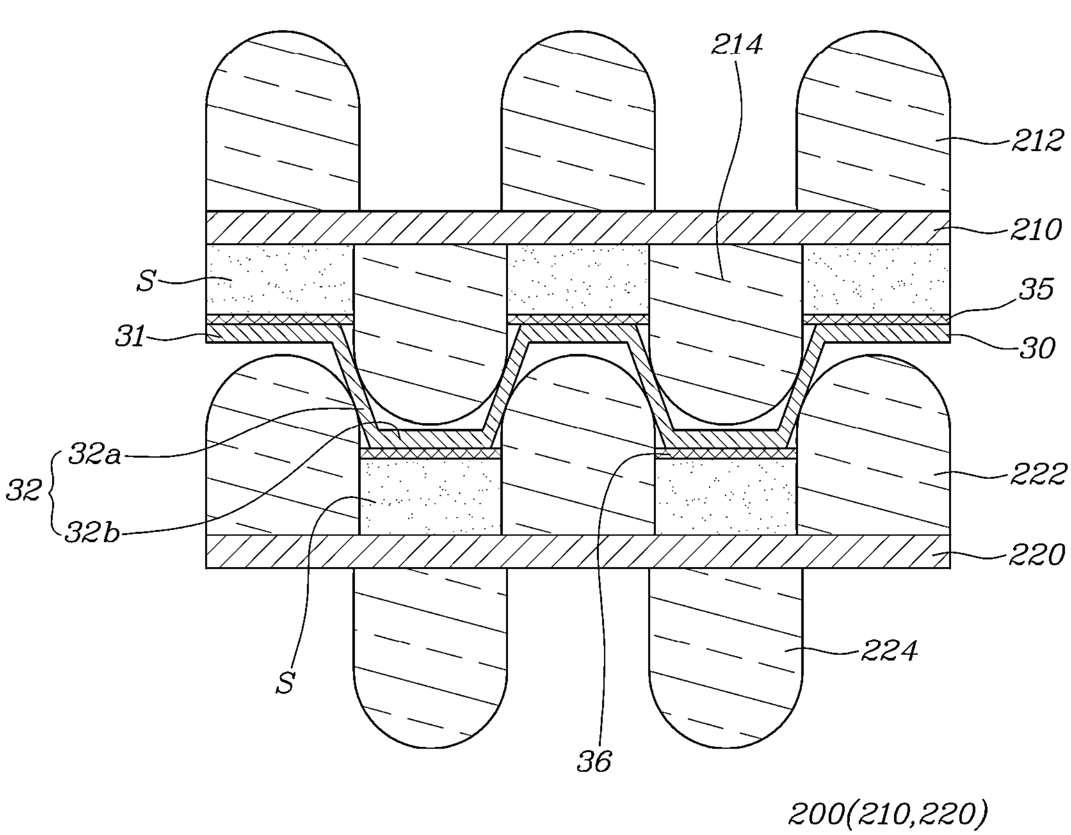
FIGS. 5A and 5B are views showing the structure and arrangement of a jig for surface treatment of a separator according to another embodiment of the present disclosure.
Figure 5B:
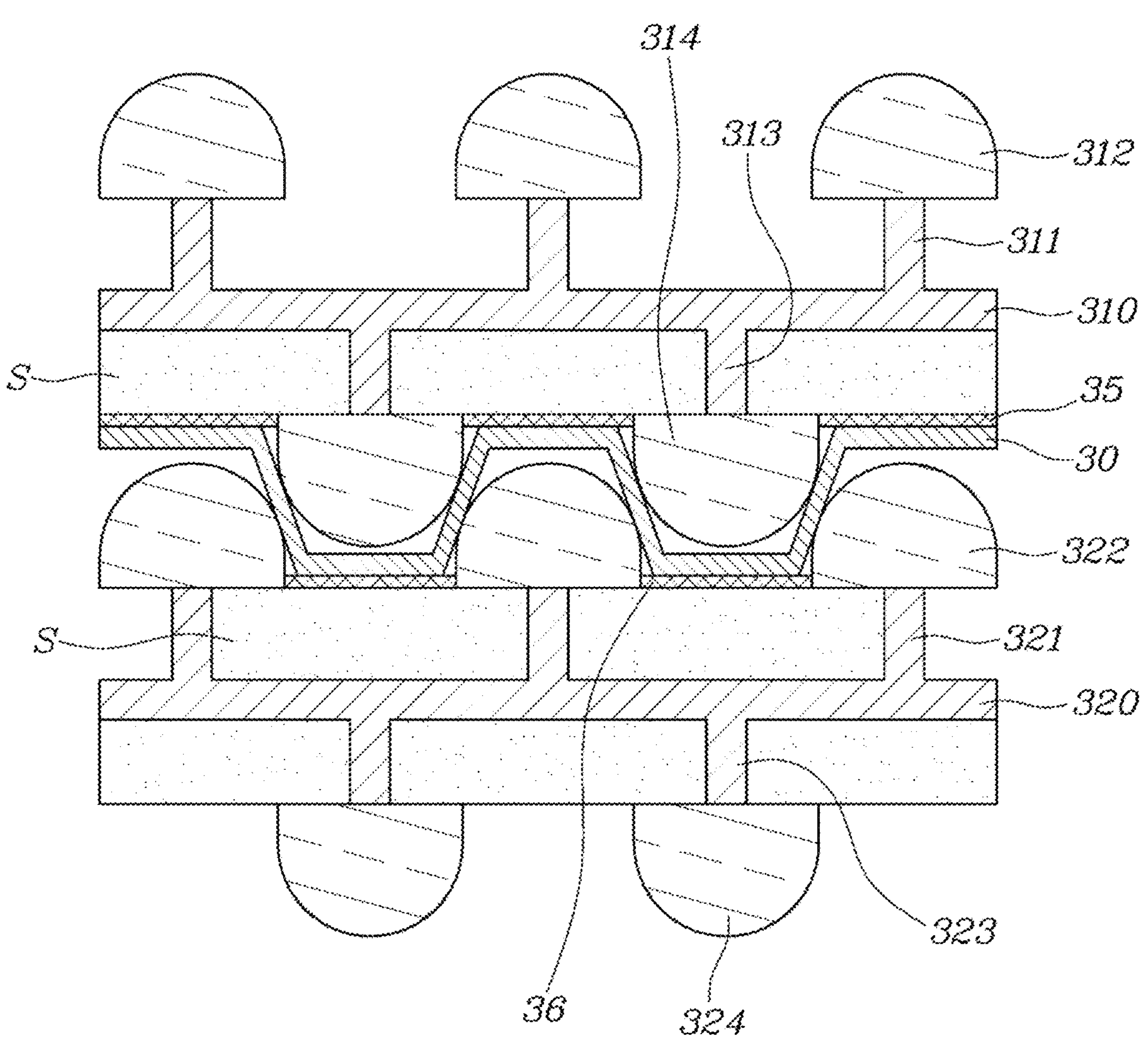

FIGS. 5A and 5B are views showing the structure and arrangement of a jig for surface treatment of a separator according to another embodiment of the present disclosure.

First, as shown in FIG. 5A, the jig 200 for surface treatment of a separator according to another embodiment of the present disclosure includes a first jig disposed on one side of the separator 30 and a second jig disposed on the other side of the separator 30, as in the above-described embodiment.

In addition, the first jig includes the first plate part 210 and the first mask parts, and the second jig includes the second plate part 220 and the second mask parts.

In this case, each of the first plate part 210 and the second plate part 220 is made to be flat by using a plastic material.

However, the first mask part of the first jig includes a first lower elastic body 214 that is drawn into the one side-channel 32 of the separator 30 and is in close contact with the inner surface of the one side-channel 32 of the separator 30 while being deformed in shape by elasticity.

Then, the first mask part of the first jig further includes a first upper elastic body 212 that is drawn into the other side-channel of the separator 30 and is in close contact with the inner surface of the other side-channel of the separator 30 while being deformed in shape by elasticity.

Therefore, a plurality of the first upper elastic bodies 212 is provided on one side of the first plate part 210, and a plurality of the first lower elastic bodies 214 is provided on the other side of the first plate part 210.

Similarly, the second mask part of the second jig includes a second upper elastic body 222 that is drawn into the other side-channel of the separator 30 and is in contact with the inner surface of the other side-channel of the separator 30 while being deformed in shape by elasticity.

In addition, the second mask part of the second jig further includes a second lower elastic body 224 that is drawn into the one side-channel of the separator 30 and is in close contact with the inner surface of the one side-channel of the separator 30 while being deformed in shape by elasticity.

Therefore, a plurality of the second upper elastic bodies 222 is provided on one side of the second plate part 220, and a plurality of the second lower elastic bodies 224 is provided on the other side of the second plate part 220.

In addition, as shown in FIG. 5B, in order to reduce the volumes of the first upper elastic body, the first lower elastic body, the second upper elastic body, and the second lower elastic body, the volumes of the first upper elastic body, the first lower elastic body, the second upper elastic body and the second lower elastic body may be reduced.

For example, a first lower support protrusion 313 that protrudes into the one side-channel of the separator 30 and is provided with the first lower elastic body 314 at the end thereof may be formed on the first plate part 310 of the first jig. A second upper support protrusion 321 that protrudes into the other side-channel of the separator 30 and is provided with the second upper elastic body 322 at the end thereof may be formed on the second plate part 320 of the second jig.

In addition, a first upper support protrusion 311 that protrudes into the other side-channel of the separator 30 and is provided with the first upper elastic body 312 at the end thereof may be formed on the first plate part 310 of the first jig. A second lower support protrusion 323 that protrudes into the one side-channel of the separator 30 and is provided with the second lower elastic body 324 at the end thereof may be formed on the second plate portion 320 of the second jig.

Thus, the first upper elastic body 312, the first lower elastic body 314, the second upper elastic body 322, and the second lower elastic body 324 may be fixed to the first plate part 310 and the second plate part 320 by the first upper support protrusion 311, the first lower support protrusion 313, the second upper support protrusion 321, and the second lower support protrusion 323, respectively.

Meanwhile, a method for manufacturing a separator for a fuel cell by using the jig for surface treatment of the separator provided as described above will be described.

First, the separator in which each land and each channel are alternately and repeatedly formed on one side and the other side according to the concavo-convex shape is prepared (separator preparation step).

In addition, the first jig including the first plate part that is disposed and spaced apart in the direction of one side from the one side-land of the separator, and the first mask parts that protrude from the first plate part in the direction of the one side-channel of the separator to cover the inner surface of the one side-channel is prepared (first jig preparation step)

In addition, the second jig including the second plate part that is disposed on the other side of the separator and spaced apart from the other side-land of the separator in the direction of the other side, and the second mask parts that protrude from the second plate part in the direction of the other side-channel of the separator to cover the inner surface of the other side-channel is prepared (second jig preparation step).

When the separator, the first jig, and the second jig are prepared in this way, the first jig is disposed on one side of the separator, and the second jig is disposed on the other side of the separator (jig disposition step).

In this case, the first jig and the second jig are brought into close contact with one side and the other side of the separator, respectively, masking the one side-channel by the first mask parts while exposing the one side-land of the separator, and masking the other side-channel by the second mask parts while exposing the other side-land of the separator.

The separator masked on both sides by the first jig and the second jig in this way is immersed in the coating solution (S), so that the first coating layer is formed on the exposed one side-land of the separator, and the second coating layer is formed on the exposed other side-land (coating step).

When the coating step is performed in this way, the first coating layer and the second coating layer are partially formed on the surface of the separator. Accordingly, in the area where the first coating layer and the second coating layer are not formed, the state in which the passivation film is formed is maintained due to the characteristics of the material of the separator, and accordingly, the subsequent heat treatment process for forming the passivation film as in the conventional art to improve corrosion resistance can be omitted or reduced.

Figure 4A:
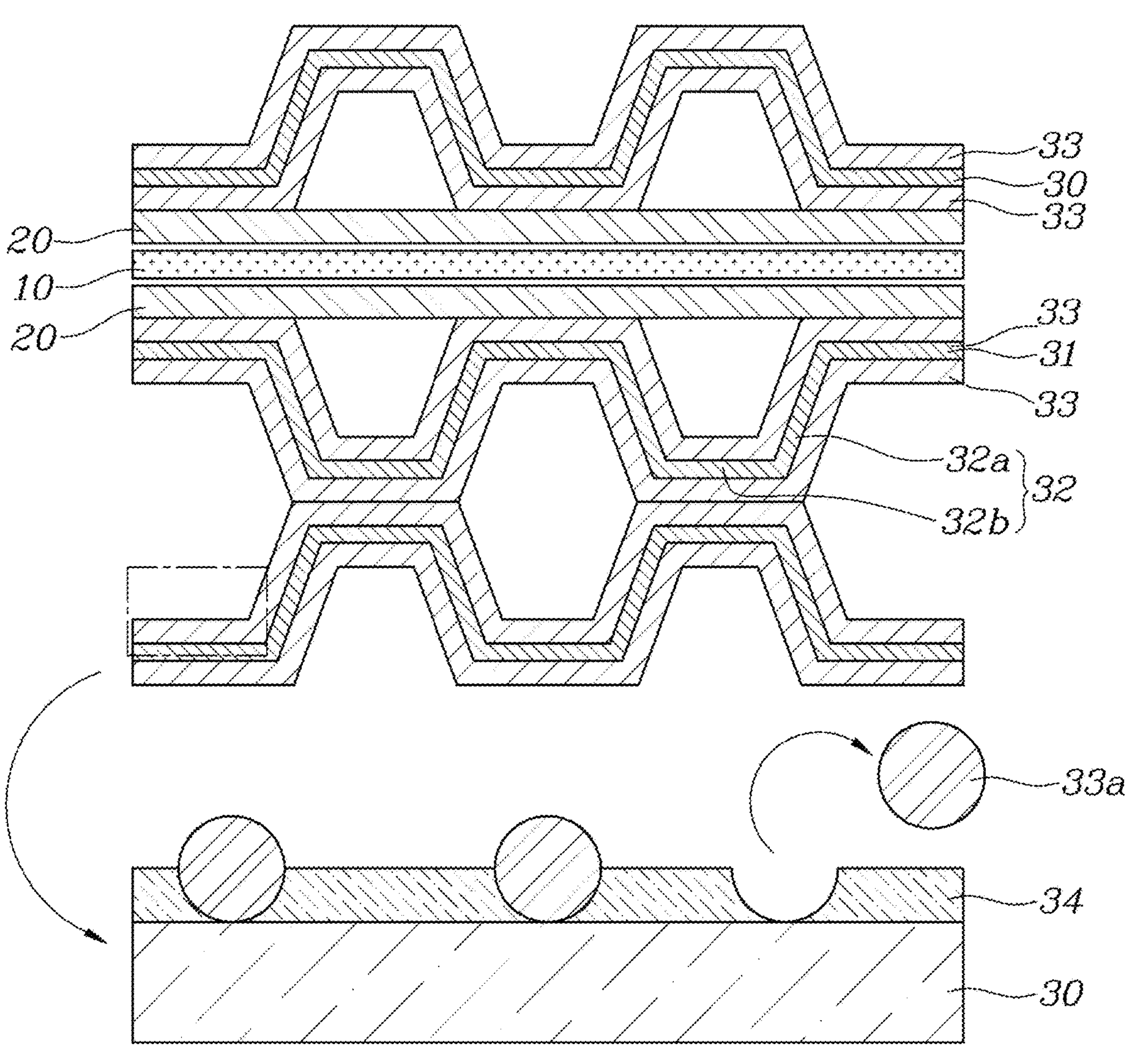
FIG. 4A is a view showing a conventional typical separator.
Figure 4B:
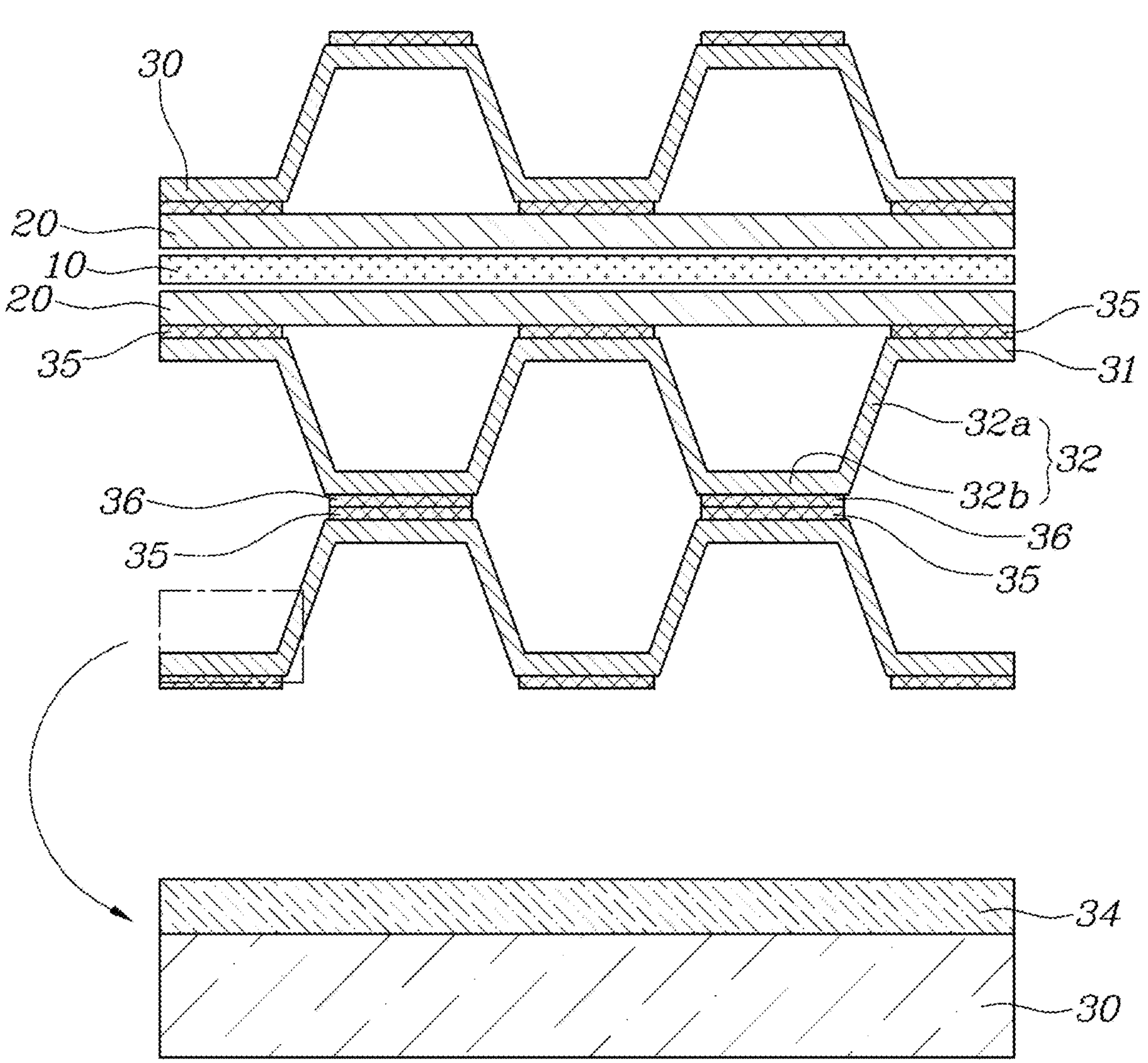
FIG. 4B is a view illustrating a channel portion of a separator according to one embodiment of the present disclosure.

Meanwhile, FIG. 4A is a view showing a conventional typical separator, and FIG. 4B illustrates a channel portion of a separator according to one embodiment of the present disclosure.

As shown in FIG. 4A, in the case of a conventional typical separator, there is a problem that conductive particles **33*a* are penetrated into the passivation film 34 formed on the surface of the separator in the coating step of forming the coating layer, and the conductive particles 33*a* are desorbed by the flow of the reactive gas and the generated water during the operation of the fuel cell, and thus, corrosion starts from the point where the conductive particles 33*a*** are desorbed.

On the other hand, in the case of the separator according to the present disclosure as shown in FIG. 4B, the passivation film is formed in the area where the first coating layer and the second coating layer are not formed, and the conductive particles do not penetrate into the passivation film 34 formed on the surface of the separator in the coating step of forming the coating layer.

Therefore, the occurrence of a problem in which conductive particles are desorbed by the flow of reactive gas and generated water is fundamentally blocked even during the operation of the fuel cell, and it is possible to block the occurrence of a point where corrosion starts as in the conventional art.

Although the present disclosure has been described with reference to the accompanying drawings and the above-described embodiments, the present disclosure is not limited thereto. Accordingly, those of ordinary skill in the art can variously change and modify the embodiment without departing from the spirit of the present disclosure.

DESCRIPTION OF REFERENCE NUMERALS

10: membrane-electrode assembly
20: gas diffusion layer
30: separator
31: land
32: channel
32*a*: side
32*b*: bottom
33: coating layer
33*a*: conductive particle
34: passivation film
35: first coating layer
36: second coating layer
110: first jig
111: first plate part
112: first side part
113: first bottom part
120: second jig
121: second bottom part
122: second side part
123: second plate part
210: first plate part
212: first upper elastic body
214: first lower elastic body
220: second plate part
222: second upper elastic body
224: second lower elastic body
310: first plate part
311: first upper support protrusion
313: first lower support protrusion
314: first lower elastic body
320: second plate part
321: second upper support protrusion
322: first upper elastic body
323: second lower support protrusion
324: second lower elastic body
S: coating solution

What is claimed is:

1. A jig for surface treatment of a separator of a fuel cell, where the jig is used to partially form a coating layer on a surface of the separator in which each land and each channel are alternately and repeatedly formed on a first side and a second side corresponding to a concavo-convex shape, the jig comprising:

a first jig comprising:

a first plate part disposed on the first side of the separator and spaced apart from a one side-land of the separator in a direction of the first side; and first mask parts that protrude from the first plate part in a direction of a one side-channel of the separator to cover an inner surface of the one side-channel; and a second jig comprising:

a second plate part disposed on the second side of the separator and spaced apart from an other side-land of the separator in a direction of the second side; and second mask parts that protrude from the second plate part into a direction of an other side-channel of the separator to cover an inner surface of the other side-channel, wherein:

the first jig is formed in a shape corresponding to the concavo-convex shape of the first side of the separator, and the first plate part and the first mask parts are integrally formed using a non-conductive material, the second jig is formed in a shape corresponding to the concavo-convex shape of the second side of the separator, and the second plate part and the second mask parts are integrally formed using the non-conductive material, the first mask parts of the first jig are bent into a shape corresponding to the one side-channel of the separator to be in close contact with the inner surface of the one side-channel, the second mask parts of the second jig are bent into a shape corresponding to the other side-channel of the separator to be in close contact with the inner surface of the other side-channel, the first plate part of the first jig is formed to be narrower than a width of the one side-land of the separator, and the second plate part of the second jig is formed to be narrower than a width of the other side-land of the separator.

2. The jig according to claim 1, wherein:

the first mask parts of the first jig comprise: a first side part that is in close contact with a side forming the one side-channel of the separator, and a first bottom part that is in close contact with a bottom forming the one side-channel of the separator, the second mask parts of the second jig comprise: a second side part that is in close contact with a side forming the other side-channel of the separator, and a second bottom part that is in close contact with a bottom forming the other side-channel of the separator.

3. The jig according to claim 1, wherein:

the shape of one side of the first jig and the shape of an other side of the second jig correspond to each other, the shape of an other side of the first jig and the shape of one side of the second jig correspond to each other.

* * * * *